United States Patent [19]

Debus et al.

[11] 4,118,342

[45] Oct. 3, 1978

[54] PROCESS FOR PRODUCING CATALYSTS

[75] Inventors: Henri R. Debus, Meise; Raymond M. Cahen, Brussels, both of Belgium

[73] Assignee: Labofina S. A., Brussels, Belgium

[21] Appl. No.: 808,624

[22] Filed: Jun. 21, 1977

[51] Int. Cl.$^2$ ............................ B01J 27/02; C11C 3/12
[52] U.S. Cl. ......................................... 252/439; 260/409
[58] Field of Search ........................... 252/439; 260/409

[56] References Cited

U.S. PATENT DOCUMENTS

| | | | |
|---|---|---|---|
| 2,123,342 | 7/1938 | Paterson | 252/472 X |
| 2,468,799 | 5/1949 | Ziels | 260/409 |
| 3,821,123 | 6/1974 | Germanas et al. | 252/439 |
| 3,832,418 | 8/1974 | Bercik et al. | 252/439 X |
| 3,856,831 | 12/1974 | Tateishi et al. | 260/409 |

FOREIGN PATENT DOCUMENTS

| | | | |
|---|---|---|---|
| 1,331,283 | 12/1963 | France | 252/439 |
| 1,279,661 | 10/1968 | Fed. Rep. of Germany | 252/439 |
| 6,403,451 | 3/1965 | Netherlands | 252/439 |

*Primary Examiner*—Delbert E. Gantz
*Assistant Examiner*—William G. Wright

[57] ABSTRACT

A process for producing a partially sulfurized nickel catalyst is disclosed wherein a pre-reduced nickel catalyst comprising nickel having a crystallite size of between about 10 and about 200 Å is treated with at least one organic sulfur compound selected from the group consisting of thiophene, alkylthiophenes and mono-, and disulfides and mercaptans, at a temperature of between about 75° and about 200° C at a sufficient hydrogen pressure and for a period of time sufficient to produce a partially sulfurized nickel catalyst containing from about 1.5 to about 8 parts by weight of sulfur per 100 parts by weight of nickel.

17 Claims, No Drawings

PROCESS FOR PRODUCING CATALYSTS

BACKGROUND OF THE INVENTION

This invention relates to a process for producing sulfurized nickel catalysts.

Nickel catalysts, the activity of which is modified by the presence of sulfur, have many uses, particularly for catalyzing selective hydrogenation and isomerization reactions. In particular, such sulfurized nickel catalysts are used for partial and selective hydrogenation of unsaturated fatty acids and their derivatives, e.g., esters thereof, such as triglycerides or fats. Some vegetable oils, such as soybean oil, contain compounds having several double bonds (polyenic compounds), for instance, three double bonds (trienic compounds) and two double bonds (dienic compounds), in admixture with compounds having only one double bond (monoenic compounds) and saturated compounds. For some uses, for example, for the manufacture of confectionaries, icing fats and the like, these oils must be hardened. However, the hardened product must fulfill a number of conditions; it must remain relatively hard up to a temperature in the range of from about 20° to about 40° C., but it must melt completely in the mouth. For these reasons, the hydrogenation must be highly selective and isomerization must also take place during this hydrogenation. It is a prime importance:

(1) to reduce the content of unstable polyenic compounds of the oil;

(2) to limit the formation of saturated compounds during the hydrogenation, since these saturated compounds exhibit too high of a melting point;

(3) to limit the formation of unstable conjugated dienic compounds; and, (4) to favor the isomerization to trans-isomers, which have a higher melting point than the cis-isomers. For instance, elaidic acid (the trans-isomer) has a melting point of 46.5° C., while oleic acid (the cis-isomer) has a melting point of 13.4° C. ($\alpha$ form) or 16.3° C. ($\beta$ form).

This isomerization, which is also called elaidization, does not take place in the presence of nickel catalysts free of sulfur (U.S. Pat. No. 2,123,342).

Heretofore, numerous sulfurized nickel catalysts and processes for manufacturing these catalysts have been proposed for carrying out these selective hydrogenation and isomerization reactions.

However, these catalysts have certain drawbacks. In fact, a sulfurized nickel catalyst is a nickel catalyst which is poisoned by the presence of sulfur. It results that a sulfurized catalyst is generally less active; hard fats can be produced from oils having a high iodine value (that is, a high degree of unsaturation), but the reaction rate is very low. Many attempts have been made to increase the reaction rate, but they lead to a poor selectivity of the reaction; the content of isomerized products is too low and the resulting hardened fat does not fulfill the requirements for the intended use in foods. A valuable catalyst for hardening oils must fulfill a number of conditions, (activity, selectivity and isomerization power) which are somewhat conflicting.

Moreover, many methods for producing the sulfurized nickel catalysts give erratic results: the metallic catalysts are irregularly sulfurized and their activity varies widely. Furthermore, some previously proposed methods require a close control of working conditions. For instance, a sulfurized nickel catalyst can be prepared by reaction between a nickel catalyst and H$_2$S. However, the reaction is so exothermic that provision must be made for removing the reaction heat (Kirkpatrick "Nickel Sulfide Catalysts," Advances in Catalysis, Vol. III, p. 329, 1951).

SUMMARY OF THE INVENTION

It is an object of the present invention to provide a process for preparing partially sulfurized nickel catalyst, particularly a sulfurized nickel catalyst, having improved catalytic properties.

It is a further object of the present invention to provide such a process, wherein a constant quality of the sulfurized catalyst is insured and wherein the reaction can easily be controlled, and the desired sulfur content can easily be adjusted.

It is a further object of the present invention to provide such a process wherein catalysts which are commercially available at low cost can be used as a starting material.

It is still a further object of the present invention to provide such a proess wherein the sulfurization can be effected at sufficiently mild reaction conditions, particularly at sufficiently low temperatures not to affect the structure of the catalyst.

It is yet a further object of the present invention to provide such a process wherein the formation of any by-products which might interfere with the catalytic properties is avoided.

In order to accomplish the foregoing objects according to the present invention, there is provided a process for producing a partially sulfurized nickel catalyst which comprises the step of treating a pre-reduced nickel catalyst comprising nickel having a crystallite size of between about 10 and about 200 Å with at least one organic sulfur compound selected from the group consisting of thiophene, alkylthiophenes and mono- and disulfides and mercaptans at a temperature of between about 75° and about 200° C. at a sufficient hydrogen pressure and for a period of time sufficient to produce a partially sulfurized nickel catalyst containing from about 1.5 to about 8 parts by weight of sulfur per 100 parts by weight of nickel.

The organic groups within the organic sulfur compounds may be hydrocarbon groups, such as, alkyl, aryl, or aralkyl groups, which together contain a total number of between about 1 and about 40 carbon atoms, preferably between about 2 and about 32 carbon atoms. Either a single organic sulfur compound or mixtures thereof can be applied.

DETAILED DESCRIPTION OF PREFERRED EMBODIMENTS

The nickel catalyst which is used as starting material according to the invention can be practically pure nickel or any supported nickel catalyst which comprises nickel on a conventional carrier material. Therefore, the nickel content of the catalyst may vary between wide limits. Generally, commercial catalysts are supported catalysts, and the support is most often an inorganic carrier material, e.g., an oxide of silicium and/or aluminum, such as silica, kieselguhr, alumina or a mixture of silica and alumina. Owing to the pyrophoric property of reduced nickel, these commercial catalysts are conveniently protected by a layer of fatty material, such as stearine, the triglyceride of stearic acid, or hardened soybean oil. The nickel content of suitable commercial supported nickel catalysts may vary between about 5 and about 75%.

Such pre-reduced and protected nickel catalysts are commercially available and commonly used for many hydrogenation processes, for instance, a non-selective hydrogenation of oils and fats.

It has been found that the size of the nickel crystallites within the nickel catalyst (supported or not) must not exceed about 200 Å. Partially sulfurized nickel catalyst prepared from nickel having crystallite sizes lower than about 200 Å, e.g., of between about 10 Å and about 200 Å and advantageously lower than about 150 Å, e.g., of between about 10 and about 150 Å, have more uniform surface properties. Sulfur is bound to the surface of the catalysts, which therefore are uniformly sulfurized. It results that the sulfurized nickel catalysts are more selective and this selectivity is reproducible from one batch of catalyst to another. The hydrogenation of unsaturated fatty acids and their derivatives gives particularly improved results when the sulfurized nickel catalysts are prepared from pre-reduced nickel catalysts having crystallite sizes lower than 60 Å. Nickel catalysts wherein the major portion of the crystallites has a size as low as 10 Å and even less may be used for producing sulfurized nickel catalysts according to the process of the present invention.

The nickel catalyst is reacted with a sulfur-containing organic compound selected from the group of thiophenes, monosulfides, disulfides, mercaptans and mixtures thereof, in the presence of hydrogen. The choice of the sulfur compound depends on many factors, such as, availability, price, odor, volatility, sulfur content and ease of breakdown of the sulfur linkage. Monosulfides and disulfides particularly useful in the practice of this invention contain n- or tert-alkyl groups containing at least 4 carbon atoms, e.g., between 4 and 16 carbon atoms, such as tert-butyldisulfide, tert-octyldisulfide, tert-dodecyldisulfide and dibutylsulfides. Linear and branched chain alkyl mercaptans and naphthyl mercaptans are readily available. However, mercaptans having a low molecular weight alkyl radical (e.g., ethyl-, isopropyl, n-propyl-, tert- or sec.- or n-butylmercaptans) are flammable liquids. Higher mercaptans containing from 6 to 16 carbon atoms, such as cyclohexyl mercaptan, n- and tert-octyl mercaptans, tert-nonyl mercaptan, tert-tetradecyl mercaptan and their mixtures are preferably used. Tert-dodecyl mercaptan is easily available, at low price and is more particularly employed in the process of the present invention.

The reaction between the pre-reduced nickel catalyst and the sulfur-containing organic compound is generally carried out at a temperature within the range of about 75° and about 200° C. At lower temperatures, the reaction rate is too slow and in some cases the sulfur-containing compound does not react. At temperatures higher than 200° C., a modification of the crystallite size may occur and this modification may be detrimental as to the catalytic properties of the sulfurized catalyst. The reaction is advantageously conducted at a temperature from about 125° to about 175° C.

The hydrogen pressure may also vary between wide limits. Pressures lower than about 5 kg/cm² result in a low reaction speed, whereas pressures higher than 50 kg/cm² do not give any improvements which would compensate the higher costs connected therewith. The most advantageous pressure range lies between about 10 and 30 kg/cm².

The reaction time which is required for sulfurizing nickel catalysts depends on many factors, such as temperature, hydrogen pressure, and the type of sulfur-containing compound employed. This reaction time and the amount of sulfur-containing compound must be selected to achieve a sulfur content of between about 1.5 and about 8, particularly between about 2 and about 6 parts by weight per 100 parts of nickel. Sulfurized nickel catalysts prepared from pre-reduced nickel catalysts having a crystallite size varying between about 40 and about 60 Å are particularly active and selective when the sulfur content is between about 2.5 and about 3.5 weight percent, based on the weight of nickel.

According to an advantageous embodiment of the present invention, the starting nickel catalyst to be sulfurized is dehydrated in order to remove any water which was formed during the preparation of this catalyst by reduction of nickel oxide. Starting nickel catalysts which are free from any residual water can be prepared by known dehydrating methods, e.g., by heating these catalysts at a temperature lower than 100° C., under vacuum. It is also advantageous to use hydrogen which is practically free from water. It has been found that the presence of residual water affects the sulfurization step in the following ways:

(a) it promotes the formation of nickel crystallites having a size exceeding 200 Å, during a thermal treatment, e.g., during the reaction with the S-containing organic compound, and (b) it promotes hydrolysis of the fatty coating, e.g., of the stearine, thereby forming fatty acids. These fatty acids react with the residual nickel oxide and form nickel soaps and water. These nickel soaps act as catalyst poisons, while water promotes the formation of large nickel crystallites.

The partially sulfurized nickel catalysts prepared according to the process of the present invention can be used for many hydrogenation reactions. They are particularly suitable for the selective hydrogenation and isomerization of fatty oils in order to produce fats having melting points within a range of 30° to 40° C. and usually within the range of 38° to 40° C. The hydrogenation must be directed to the formation of monoenic compounds and be accompanied by isomerization of cis-isomers to trans-isomers. Such a process is thus quite different from the hardening process, where the fatty acids are completely hydrogenated.

As already mentioned in the foregoing, this partial hardening of fatty oils must be active and selective. These conditions depend more particularly on some characteristics of the catalyst, which depend on the method of preparation.

It is a particular advantage of the process of the present invention that sulfurized catalysts are prepared from pre-reduced commercial nickel catalysts which are widely used in many processes and are thus available at low costs. Moreover, the process can be easily applied and does not require a treatment at high temperatures, which would be detrimental to the crystallite size of the nickel and thus to the activity and selectivity of the sulfurized catalyst.

A further advantage of the present process results from the fact that the sulfur-containing organic compound reacts completely under the working conditions of the present invention. The nickel catalyst is partially sulfurized, whereby a catalyst containing between about 1.5 and about 8% by weight of sulfur based on the amount of nickel is produced and the required amount of S can easily be adjusted. Moreover, the sulfurization is carried out at a temperature which does not exceed 200° C.; the partially sulfurized catalyst contains therefore small crystallites of nickel.

Furthermore, when a disulfide or a mercaptan having a high molecular weight, such as, for instance, tert-dodecyl mercaptan, is used in the present process, the organic by-product which is formed during the decomposition of the sulfide molecule in order to generate S is a paraffinic compound which may be left in the protective coating of the catalyst, e.g., in the stearine, without detrimental effect on the properties of the sulfurized catalyst.

The partially sulfurized nickel catalysts prepared according to the process of the present invention are characterized by the fact that they comprise partially sulfurized nickel which may or may not be supported by a conventional carrier material and which exhibits small crystallite size, a low S/Ni ratio and a uniform S distribution. As compared with other catalysts containing larger crystallites and/or having higher S/Ni ratios, the catalysts of the present invention not only exhibit an improved selectivity but also an improved activity in hydrogenation and isomerization processes.

By way of example, soybean oil which is liquid at room temperature and exhibits an iodine value of about 120–140 can be hydrogenated in the presence of these catalysts to form a hardened fat having a melting point within the range of from about 38° to about 40° C. and an iodine value of about 70 ± 2. The content of trienic compounds of the hardened fat must be decreased and should preferably be lower than 1%, but thereby avoiding a complete hydrogenation into saturated compounds. Moreover, the isomerization of cis-isomers to trans-isomers must reach at least 50%.

The following examples illustrate the present invention without limiting it.

EXAMPLE 1

A pressure vessel provided with a stirring device is charged with 80 g of a dehydrated commercial nickel catalyst containing:
Nickel: 22.8% (by weight)
$SiO_2$: 11.7%
$Al_2O_3$: traces
Fatty coating: balance up to 100%.

The nickel crystallites have a mean diameter of 56 Å.

This catalyst is treated with thiophene at a temperature of 200° C. and under a hydrogen pressure of 50 kg/cm², during 8 hours.

The sulfurized nickel catalyst contains 2.46% by weight of S based on the amount of Ni and the nickel crystallites have a mean diameter of 67 Å.

Soybean oil is hydrogenated in the presence of this catalyst, at a temperature of 180° C. and at atmospheric pressure, during 360 minutes, the amount of catalyst being 5 parts per 1,000 parts (by weight) of the oil.

The respective compositions of the starting material and of the hydrogenated fat are given in Table I below.

TABLE I

| Composition (acid components) | Starting material | Hydrogenated fat |
|---|---|---|
| $C_{14}$ : 0 + $C_{16}$ : 0(*) | 10.5% by weight | 11.6% by weight |
| $C_{18}$ : 0 | 3.5% by weight | 14.9% by weight |
| $C_{18}$ : 1 | 25.1% by weight | 64.5% by weight |
| $C_{18}$ : 2 | 53.0% by weight | 7.9% by weight |
| $C_{18}$ : 3 | 7.5% by weight | — |
| Trans-isomers (wt. %) | — | 52.2% by weight |
| Iodine index | 126.6 | 69.5 |
| Melting point (° C) | liquid at room temperature | 39.6 |

(*)The indexes 0, 1, 2 and 3 designate the number of double bonds (C = C) in the fatty acids).

By way of comparison, the hardening of soybean oil is carried out in the presence of the same amounts of the following other catalysts, and at the same pressure and temperature.

(A) A catalyst consisting in nickel sulfide $Ni_3S_2$ (1 part by weight) and $\alpha$-$Al_2O_3$ (2 parts by weight):

The period of time required to obtain a hardened fat having an iodine index of 68.6 was 11 hours.

(B) Catalysts prepared by treating nickel on diatomaceous earth with a gas stream containing $H_2$ and $H_2S$. The sulfur content of these catalysts has been varied between 1 and 10 weight percent (based on nickel). No suitable hardened fat was obtained with these catalysts.

(C) A catalyst prepared from nickel nitrate, macroporous silica, urea and flowers of sulfur, with reduction under a flow of hydrogen at 450° C. This catalyst contains 6.2 weight percent of S based on Ni.

After 360 minutes, no more hydrogen uptake can be noticed. The hydrogenated product is liquid and its iodine index is 90.3.

(D) A catalyst prepared from nickel nitrate, silica, urea and thioacetamide.

This catalyst contains 3.6 weight percent of S based on Ni and the diameter of the Ni crystallites is 207.

After 360 minutes, the hydrogenated product is still liquid and its iodine index is 98.7; the reaction does not proceed any further after even 450 minutes.

EXAMPLE 2

A 150 liters pressure vessel provided with a stirring device is charged with 55 kg of a dehydrated nickel catalyst containing 23.5 weight percent of nickel and 12.0 weight percent of kieselguhr, the balance being a fatty coating. The mean size of the nickel crystallites is 43 Å.

This catalyst is treated with 2.81 kg of tert-dodecyl mercaptan at 150° C. under a hydrogen pressure of 25 kg/cm², for 2 hours.

The sulfurized catalyst contains 3.23 weight percent of S based on Ni and the size of the nickel crystallites is 45 Å.

Soybean oil (having the composition given in Table I of Example 1) is hydrogenated as described in Example 1.

The hydrogenated fat has the following characteristics:

COMPOSITION OF ACID CONTENTS $C_{16}$: 0: 12.0% by weight
$C_{18}$: 0: 12.5% by weight
$C_{18}$: 1: 65.5% by weight
$C_{18}$: 2: 8.0% by weight
$C_{18}$: 3: —
Trans-isomers: 57.0% by weight
Iodine index: 71.3
Melting pont: 38.6° C.

By way of comparison, the procedure as described in Example 2 is repeated but using different amounts of tert-dodecyl mercaptan, in order to produce partially sulfurized nickel catalysts with different S-contents.

A catalyst containing 1 weight percent of S based on Ni is too active. The content of saturated compounds in the hydrogenated oil and the melting point of this product are too high.

A catalyst with an S content of 10% (based on Ni) is not active enough. Soybean oil is hydrogenated for 5 hours and is still liquid.

EXAMPLE 3

The commercial nickel catalyst (100 g) described in Example 1, is treated with di-tert-octyldisulfide (2.63 g) at 100° C. and under a hydrogen pressure of 15 kg/cm$^2$ for 3 hours.

The sulfurized catalyst contains 2.34 weight percent S based on nickel and the size of the Ni crystallites is 58 Å.

Soybean oil is hydrogenated as described in Example 2 and the hydrogenated fat has practically the same characteristics as the fat obtained in Example 2.

By way of comparison, a catalyst is prepared as hereinabove described, but at a temperature of 225° C. The resulting sulfurized catalyst has practically the same composition, but the size of the Ni crystallites is 200 Å. This sulfurized catalyst is less active.

EXAMPLE 4

A nickel catalyst (100 g) without support and coated with stearine is treated with cyclohexyl mercaptan (3.65 g) at 125° C. and under a hydrogen pressure of 30 kg/cm$^2$ for 3 hours.

The sulfurized nickel catalyst contains 25 weight percent of Ni and 1.0 weight percent of S and the size of the Ni crystallites is 126 Å.

EXAMPLE 5

Example 2 is repeated except that 1,740 g of tert-octyl mercaptan are used as sulfur-containing compound.

The sulfurized catalyst contains 2.75 weight percent of S based on Ni and the size of the Ni crystallites is 45 Å.

EXAMPLE 6

A dehydrated nickel catalyst (100 g) containing 25.8 weight percent of nickel, 12.7 weight percent of a carrier consisting of alumina and 61.5 weight percent of stearine is treated with 4.93 g of tert-dodecyl mercaptan at 165° C. under a hydrogen pressure of 15 kg/cm$^2$ for 2 hours.

The sulfurized catalyst contains 2.85 weight percent of S based on Ni and the size of the nickel crystallites is 68 Å (as compared to 62 Å for the unsulfurized catalyst).

EXAMPLE 7

A dehydrated nickel catalyst containing 23.54 weight percent of nickel (37.8% of which is NiO), 11.7 weight percent of kieselguhr as carrier and 64.76 weight percent of stearine is used as a starting material. The size of the nickel crystallites is 54 Å.

A pressure vessel is charged with 500 g of this starting material which is then treated with 17.4 g of n-dibutylsulfide in the presence of hydrogen under a pressure of 25 kg/cm$^2$ at 150° C. during 2 hours.

The sulfurized catalyst contains 3.2 weight percent S based on Ni and the size of the nickel crystallites is practically the same as that of the starting material.

While the invention has now been described in terms of various preferred embodiments, and exemplified with respect thereto, the skilled artisan will readily appreciate that various substitutions, changes, modifications, and omissions may be made without departing from the spirit thereof. Accordingly, it is intended that the scope of the invention be limited solely by that of the following claims.

What is claimed is:

1. A process for producing a partially sulfurized nickel hydrogenation catalyst adapted for selective hydrogenation of unsaturated higher fatty acid compounds with reduction of the content of polyenic compounds, limitation of the formation of saturated compounds and of conjugated dienic compounds and with isomerization to trans-isomers, which comprises the step of treating a pre-reduced nickel catalyst comprising nickel, having a crystallite size of between about 10 and about 200 Å with at least one organic sulfur compound selected from the group consisting of thiophene, alkylthiophenes, mono- and disulfides and mercaptans at a temperature of between about 75° C. and about 200° C. at a hydrogen pressure sufficient and for a period of time sufficient to produce a partially sulfurized nickel hydrogenation catalyst containing from about 1.5 to about 8 parts by weight of sulfur per 100 parts by weight of nickel.

2. The process as defined in claim 1, wherein the hydrogen pressure is between about 5 and about 50 kg/cm$^2$.

3. The process as defined in claim 1, wherein the organic groups within the organic sulfur compounds are hydrocarbon groups which contain a total number of carbon atoms of between about 1 and about 40.

4. The process as defined in claim 1, wherein the size of the nickel crystallites of the treated nickel catalyst is between about 10 and about 150 Å.

5. The process as defined in claim 4, wherein the size of the nickel crystallites is between about 10 and about 60 Å.

6. The process as defined in claim 3, wherein the sulfur-containing compound is a monosulfide or a disulfide containing alkyl group having at least 4 carbon atoms.

7. The process as defined in claim 3, wherein the sulfur-containing compound is a mercaptan containing from 6 to 16 carbon atoms.

8. The process as defined in claim 6, wherein the sulfur-containing compound is a butyl sulfide.

9. The process as defined in claim 6, wherein the alkyl groups are n-alkyl groups.

10. The process as defined in claim 6, wherein the alkyl groups are tertiary alkyl groups.

11. The process as defined in claim 1, wherein the temperature is between about 125° and about 175° C.

12. The process as defined in claim 2, wherein the pressure is comprised between about 10 and about 30 kg/cm$^2$.

13. The process as defined in claim 1, wherein the nickel catalyst comprises nickel on a carrier.

14. The process as defined in claim 13, wherein the size of the nickel crystallites is between about 40 and about 60 Å.

15. The process as defined in claim 14, which comprises treating the nickel catalyst with about the theoretical amount of a mercaptan containing from about 6 to about 16 carbon atoms sufficient to obtain a partially sulfurized nickel catalyst wherein the sulfur content is between about 2.5 and about 3.5 weight percent based on the amount of nickel.

16. The process as defined in claim 15, wherein the temperature is between about 125° and 175° C. and the pressure is between about 10 and about 30 kg/cm².

17. A partially sulfurized nickel hydrogenation catalyst adapted for selective hydrogenation of unsaturated higher fatty acid compounds with reduction of the content of polyenic compounds, limitation of the formation of saturated compounds and of conjugated dienic compounds and with isomerisation into trans-isomers, comprising nickel having a crystallite size of between 10 and 200 Å and from about 1.5 to about 8 parts by weight of sulfur per 100 parts by weight of nickel which is a reaction product obtained by treating a pre-reduced nickel catalyst according to the process as defined in claim 1.

* * * * *